C. F. FLEMING.
FRUIT PROCESSING DEVICE.
APPLICATION FILED MAR. 28, 1908.
916,290.
Patented Mar. 23, 1909.
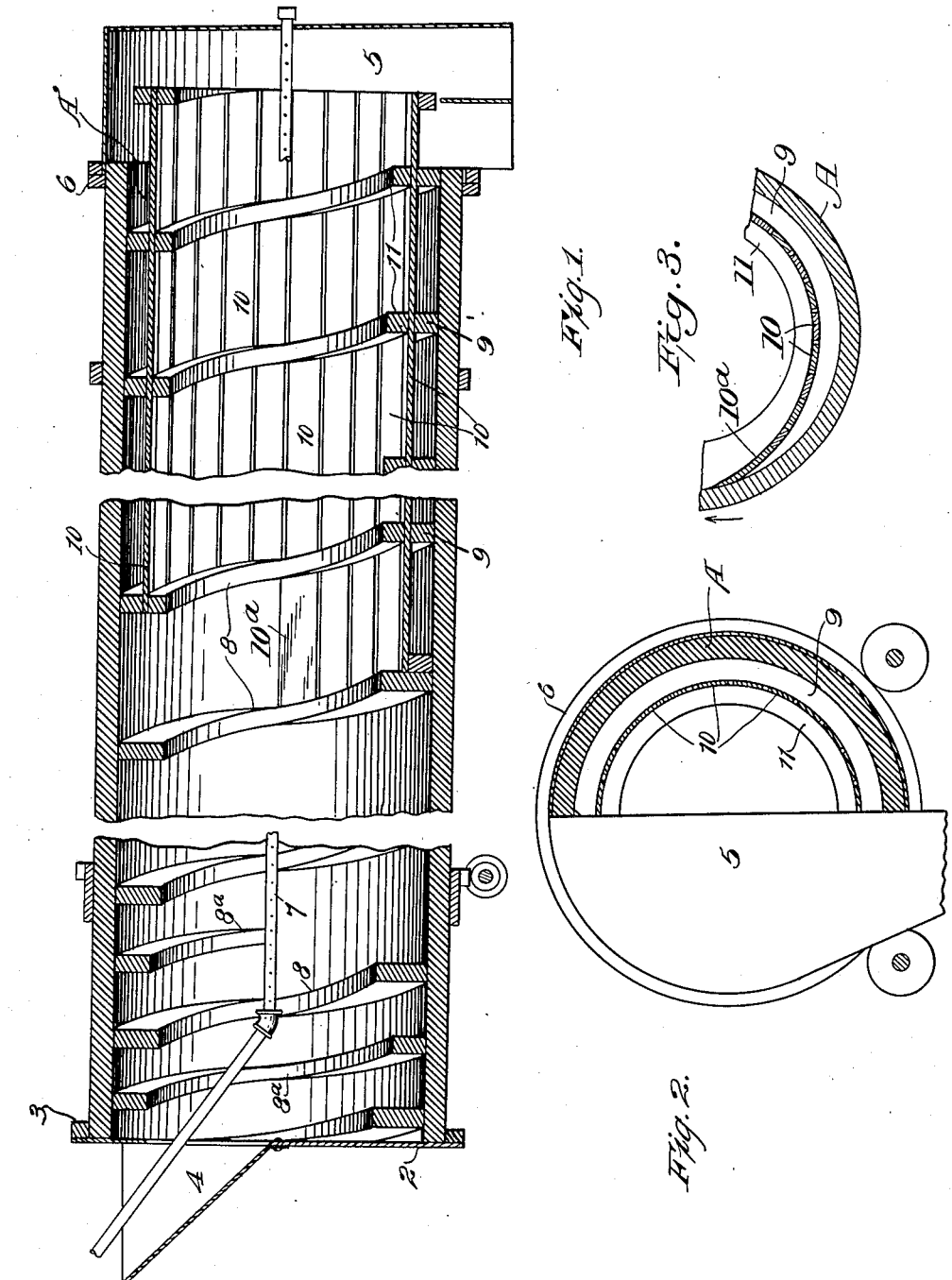
Witnesses:
Inventor:
Charles F. Fleming.
By Geo. H. Strong
Atty.

UNITED STATES PATENT OFFICE.

CHARLES F. FLEMING, OF SAN JOSE, CALIFORNIA.

FRUIT-PROCESSING DEVICE.

No. 916,290.  Specification of Letters Patent.  Patented March 23, 1909.

Application filed March 28, 1908. Serial No. 423,864.

*To all whom it may concern:*

Be it known that I, CHARLES F. FLEMING, citizen of the United States, residing at San Jose, in the county of Santa Clara and State of California, have invented new and useful Improvements in Fruit-Processing Devices, of which the following is a specification.

My invention relates to an apparatus for processing fruit.

It consists of a revoluble cylinder, with means for cleansing, steaming and advancing the fruit, and separating it from the wash water.

It comprises a combination of parts, and details of construction which will be more fully explained by reference to the accompanying drawings, in which—

Figure 1 is a longitudinal section. Fig. 2 is a rear end view, partly in section. Fig. 3 is a cross sectional view of a portion of the cylinder showing the gradual incline $10^a$.

In the subsequent preparation of prunes and like fruit after having been dried, it is desirable to wash and thoroughly cleanse the fruit from accumulated dust and associated impurities, to steam and soften the fruit and to separate it from the washing water.

My invention is designed to provide a continuous apparatus in which this work is automatically effected.

As shown in the drawings A is a cylinder of suitable material and dimensions. The cylinder is preferably mounted at a slight incline from the horizontal, and may be supported upon bearing rollers, and revolved by belt, sprocket-chain, gear, or other convenient means.

The upper or receiving end of the cylinder abuts against a head 2, which may have a flange 3 of such interior diameter that the end of the cylinder will extend into it.

The head is stationary; the cylinder revolves freely with relation to the head, and forms a substantially close joint therewith. An opening is made in this stationary head, and a hopper 4 connects therewith, the hopper and head being stationary while the cylinder is free to revolve.

The lower end of the exterior cylinder extends to the chamber 5, and by means of abutting flanges 6, one upon the cylinder and the other upon the contiguous end of the chamber, the cylinder will revolve freely and substantially tight with relation to the chamber 5 which is stationary.

7 is a steam pipe extending into the open receiving end of the cylinder and passing entirely through it to the opposite or discharge end. This pipe is perforated with holes, and steam may be admitted from either end, and discharged into the interior of the cylinder.

Within the cylinder, and extending a certain portion of its length, from the receiving end, are spiral ribs 8 fitting closely around the interior periphery of the chamber. These ribs are of considerable depth, and are designed to retain the water, which is admitted with the fruit, through the hopper 4.

The revolution of the cylinder causes a gradual advance of the fruit by reason of these spirals, and a thorough agitation and washing thereof.

In order to properly distribute the fruit, when it is first admitted, I have shown the first two turns of the spiral as supplemented by intermediate spirals $8^a$, which terminate opposite to each other within the cylinder, and which serve to receive the mass of fruit delivered through the hopper, and to separate, equalize and advance it, so that it will be regularly delivered to the main spirals.

After the fruit has been thoroughly agitated and washed, it is desirable to separate it from the water which has become dirty. I have therefore shown the spirals from near the center, toward the discharge end of a cylinder, as being considerably reduced in depth, as shown at 9. Longitudinal strips are fixed upon the edges of these diminished spirals, these strips being secured so as to leave small openings between them. Upon the surface of these strips are fixed other shallow spirals 11, and at the point where the fruit leaves the spirals 8, there may be a gradual incline $10^a$ which lifts the fruit from the interior periphery of the cylinder, and delivers it upon the strips or slats 10, and between the spiral ribs 11. The fruit thus continues to advance by the revolution of the cylinder, and the agitation will separate the water from the fruit to a great extent, and allow it to fall through the slats and into the channel which is exterior thereto. The ribs 8 and 9 are sufficiently tight to advance the water, which is eventually discharged through the lower or discharge end of the cylinder, where it may escape.

Steam is admitted through the perforated pipe 7, and being discharged within the cylinder acts to soften and swell the fruit during its passage.

The discharge end of the interior or slat cylinder extends far enough into the chamber 5, so that the fruit passing through it will be discharged at a point beyond that at which the water is discharged, and by means of separate conveyers the water and fruit will be independently delivered, the fruit being collected in any suitable receiver.

Having thus described my invention, what I claim and desire to secure by Letters Patent is—

1. In an apparatus of the character described, a revoluble cylinder, a stationary flanged head within which the receiving end of the cylinder forms a turnable joint, an opening in said head and a hopper fixed to deliver fruit and water therein, spiral ribs fitting the interior of the cylinder acting to advance the water and fruit, means by which the fruit is subsequently lifted from the water and its advance continued, a fixed discharge chamber with which the contiguous end of the cylinder forms a turnable joint, and means whereby the water and fruit are separately discharged.

2. In an apparatus of the character described, an inclined revoluble cylinder having close fitting interior spiral ribs, a stationary head and a discharge chamber with which opposite ends of the cylinder form turnable joints, an opening in the receiving head, a hopper connected therewith for the introduction of fruit and water, supplemental distributing spirals intermediate of the first-named and contiguous to the receiving end, and a smaller interior cylinder occupying the discharge end portion of the cylinder.

3. In an apparatus of the character described, a revoluble cylinder, a receiving head and a discharge chamber, with means for forming turnable joints between the cylinder and said parts, a stationary receiving hopper communicating with the interior of the receiving end of the cylinder, spiral ribs extending from the receiving end through a portion of the length of the cylinder, said ribs being reduced in depth for the remaining distance to the discharge end, separated slats mounted upon said ribs and forming an interior open cylinder into which the fruit is delivered from the first portion of the cylinder, other spirals fitting the interior of said slat cylinder, said cylinder extending into the discharge chamber beyond the end of the main cylinder.

4. In an apparatus of the character described, a revoluble cylinder, a stationary receiving head and a discharge chamber at opposite ends, with means for making a close revoluble joint between the cylinder and these parts, a stationary hopper communicating with the interior of the cylinder through the receiving head, a perforated steam pipe extending substantially through the cylinder, spiral ribs fitting the interior of the cylinder, and extending a portion of its distance, intermediate distributing spirals at the receiving end of the cylinder, spirals of less depth continuing from the ends of the first named spirals to the discharge end of the cylinder, longitudinal slats fixed upon the inner periphery of these spirals, with open spaces between, and other spirals fitting the interior of said slats, said slats and spirals extending into the discharge chamber beyond the main cylinder.

In testimony whereof I have hereunto set my hand in presence of two subscribing witnesses.

CHARLES F. FLEMING.

Witnesses:
SEYMOUR T. MONTGOMERY,
T. S. MONTGOMERY.